United States Patent [19]

Knecht et al.

[11] Patent Number: 4,697,322

[45] Date of Patent: Oct. 6, 1987

[54] METHOD AND DEVICE FOR REPAIRING FUEL ASSEMBLIES OF BOILING-WATER NUCLEAR REACTORS

[75] Inventors: Klaus Knecht, Erlangen; Kurt Kraus, Hemhofen, both of Fed. Rep. of Germany

[73] Assignee: Kraftwerk Union Aktiengesellschaft, Mülheim, Fed. Rep. of Germany

[21] Appl. No.: 543,081

[22] Filed: Oct. 18, 1983

Related U.S. Application Data

[63] Continuation-in-part of Ser. No. 226,940, Jan. 21, 1981, abandoned.

[51] Int. Cl.[4] .................... B23P 19/04; G21C 17/00; G21C 19/00
[52] U.S. Cl. .................... 29/402.03; 29/400 N; 29/407; 29/426.2; 29/464; 29/723; 33/502; 269/43; 376/245; 376/251; 376/450
[58] Field of Search ............. 29/402.03, 400 N, 407, 29/426.1, 426.2, 426.3, 428, 455 R, 464, 559, 723; 33/174 PA, 174 PB, 175; 269/43, 287; 376/245, 250, 251, 252, 253, 260, 261, 269, 271, 450

[56] References Cited

U.S. PATENT DOCUMENTS

| 2,265,373 | 12/1941 | Johnson | 33/175 |
|---|---|---|---|
| 2,336,541 | 12/1943 | Gunter et al. | 269/287 X |
| 2,824,378 | 2/1958 | Stokes | 33/175 |
| 3,212,990 | 10/1965 | Murtha | 29/400 N |
| 3,263,314 | 8/1966 | Smeltzer et al. | 269/287 X |
| 3,273,251 | 9/1966 | Saizon | 33/174 PA |
| 3,468,024 | 9/1969 | Yonkers | 29/428 |
| 3,481,021 | 12/1969 | Glandin et al. | 29/455 |
| 3,813,286 | 5/1974 | Goldman et al. | 376/251 |
| 3,823,068 | 7/1974 | Worlton et al. | 376/450 |
| 3,846,235 | 11/1974 | Jones et al. | 376/450 |
| 3,887,980 | 6/1975 | Yates et al. | 29/723 |
| 3,929,570 | 12/1975 | Jones et al. | 376/450 |
| 3,983,632 | 10/1976 | Halstead | 33/174 PA |
| 4,039,376 | 8/1977 | Wachter | 376/252 |
| 4,134,789 | 1/1979 | Aubert | 376/262 |
| 4,155,808 | 5/1979 | Jabsen | 376/245 X |
| 4,202,085 | 5/1980 | Vollmer | 269/43 |
| 4,292,130 | 9/1981 | Viaud et al. | 376/262 |
| 4,353,171 | 10/1982 | Spears | 33/174 PA X |

FOREIGN PATENT DOCUMENTS

2917051 11/1980 Fed. Rep. of Germany ........ 33/175

Primary Examiner—Mark Rosenbaum
Assistant Examiner—Ronald S. Wallace
Attorney, Agent, or Firm—Herbert L. Lerner; Laurence A. Greenberg

[57] ABSTRACT

A method of repairing under water a boiling water reactor-fuel assembly having a fuel assembly channel and an upper grid plate by means of a channel stripping machine, disassembling the upper grid plate, determining a damaged fuel rod and exchanging the damaged fuel rod for another fuel rod by means of a fuel rod exchanging device, which includes, after stripping off the fuel assembly channel and disassembling the upper grid plate at the location thereof in the channel stripping machine, placing on the fuel assembly a guide box with which the fuel rods of the fuel assembly are centered, then placing thereon an indicator plate and determining the varying growth of the fuel rods, and replacing the indicator plate by a centering plate to which the fuel rod-exchanging device is coupled and a device for carrying out the method.

5 Claims, 17 Drawing Figures

METHOD AND DEVICE FOR REPAIRING FUEL ASSEMBLIES OF BOILING-WATER NUCLEAR REACTORS

This is a continuation-in-part of application Ser. No. 226,940 filed Jan. 21, 1981, and now abandoned.

The invention relates to a method and device or fixture for remotely-controlled exchanging of fuel rods performed under water, as well as for inspecting fuel rods taken from fuel assemblies of boiling-water reactors, in combination with a conventional fuel channel stripping machine.

Fuel assemblies of nuclear reactors are generally formed of a multiplicity of parallel individual fuel rods which are held at a nominal mutual distance by spacer grids. A defect in a fuel assembly exists if the cladding tube of a fuel rod is damaged, so that radioactive fission products can escape into the surrounding cooling water. Every nuclear power plant is equipped with a purification system for the cooling water, the capacity of which is so large that it is entirely possible for a number of fuel rods of a reactor core to be defective without necessitating shut-down of this nuclear reactor. In order to keep the contamination of the primary loop of a plant and, accordingly, the radiation exposure of the operating personnel as low as possible during inspections, it is advisable, nevertheless, to repair fuel assemblies with defective fuel rods. This repair work consists of first tracing and locating the defective fuel assemblies and then determining the damaged fuel rods therein and exchanging them for others. Because of the extremely strong radiation of the fuel assemblies, this work must be carried out under water, i.e. in the fuel storage pool of the respective nuclear power station, for example. For this purpose, it is necessary that the individual fuel rods of the fuel assembly be made accessible, to which end the fuel-element channel stripping machine conventional with boiling-water fuel assemblies can be used. The fuel-element channels or casings are a jacket or sheathing of the fuel assembly having a substantially square cross section for the purpose of guiding the coolant and the control elements, and can be reused repeatedly. The fuel-element channels are fastened with screws to the upper grid plate of the fuel assembly, which represents part of the fuel assembly skeletal structure, and can readily be drawn upwardly off the fuel assembly by means of simple remote-controlled tools. The channels are deposited on a lateral location of the so-called channel stripping machine and held ready for reuse. This stripping machine is disposed at the edge of the fuel pit, is operated from an operating platform and can be run into different levels of height of the fuel storage pool, depending upon what work is to be performed.

The hereinaforementioned fuel assembly skeletal structure is formed of an upper grid plate and a lower grid plate which are screwed to individual fuel rods of the assembly, and the other fuel rods are guided in these plates. The spacer grids disposed at different heights hold all of the fuel rods at safe or secured spacing.

Since this assembly must be disconnected in order to exchange individual fuel rods, it is accordingly an object of the invention to provide a device for this purpose which ensures that the fuel assembly and, especially, the geometry of the individual fuel rods relative to one another, are mutually held together.

With the foregoing and other objects in view, there is provided, in accordance with the invention, a method of repairing under water a boiling water reactor-fuel assembly having a fuel assembly channel and an upper grid plate by means of a channel stripping machine, disassembling the upper grid plate, determining a damaged fuel rod and exchanging the damaged fuel rod for another fuel rod by means of a fuel rod exchanging device, which comprises, after stripping off the fuel assembly channel and disassembling the upper grid plate at the location thereof in the channel stripping machine, placing on the fuel assembly with which the fuel rods of the fuel assembly are centered, then placing thereon an indicator plate and determining the varying growth of the fuel rods, and replacing the indicator plate by a centering plate to which the fuel rod-exchanging device is coupled.

In accordance with another aspect of the invention, there is provided a device for performing a method of repairing under water a boiling water reactor-fuel assembly having a fuel assembly channel and an upper grid plate, by means of a channel stripping machine, comprising a guide box disposable on the fuel rods for centering the fuel rods, after disassembly of the grid plate so as to determine and exchange a damaged fuel rod for another fuel rod, an indicator plate disposable on the guide box for determining varying growth of the fuel rods, and a centering plate having a fuel rod changing device coupled thereto, the indicator plate being replaceable by the centering plate.

In accordance with another feature of the invention, the guide box has means for supporting it with respect to the channel stripping machine and with respect to spacers of the fuel assembly, and a plurality of combs swingable inwardly from two sides about a horizontal axis into spaces intermediate the fuel rods, the guide box being also formed with bores for receiving therein fitting pins of the indicator plate and of the centering plate for the fuel-rod changing device for mounting the respective plate on the guide box.

In accordance with a further feature of the invention, the repair device includes a plurality of pins adjustable above respective fuel-rod positions by contact with the fuel rods and lockable in the respective adjusted position thereof for determining varying fuel-rod lengths.

In accordance with a concomitant feature of the invention, the centering plate has means defining conical bores located above respective fuel rod positions, and a collar with a cross-sectional shape corresponding to that of a fuel-assembly channel removed by the channel stripping machine, the collar being of a construction for transmitting to the guide box a loading due to the fuel-rod changing device, the centering plate having fitting pins for ensuring precalculated positioning of the conical bores.

Other features which are considered as characteristic for the invention are set forth in the appended claims. Although the invention is illustrated and described herein as embodied in a repair fixture and device for fuel assemblies of boiling-water nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

Figure 1:
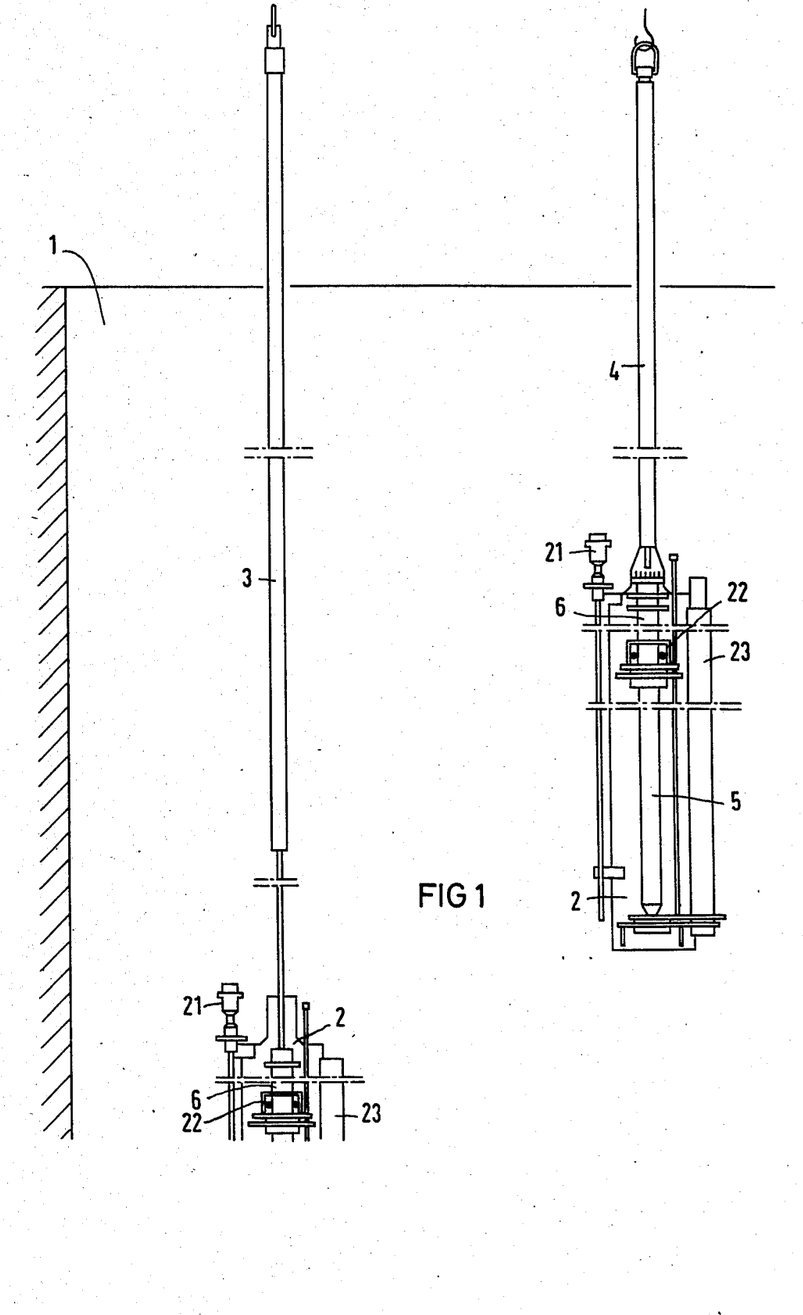
FIG. 1 is an elevational view, partly in section and partly broken away, of fuel-element channel stripping machines, according to the invention, disposed at different depths in a storage pool.
Figure 1A:
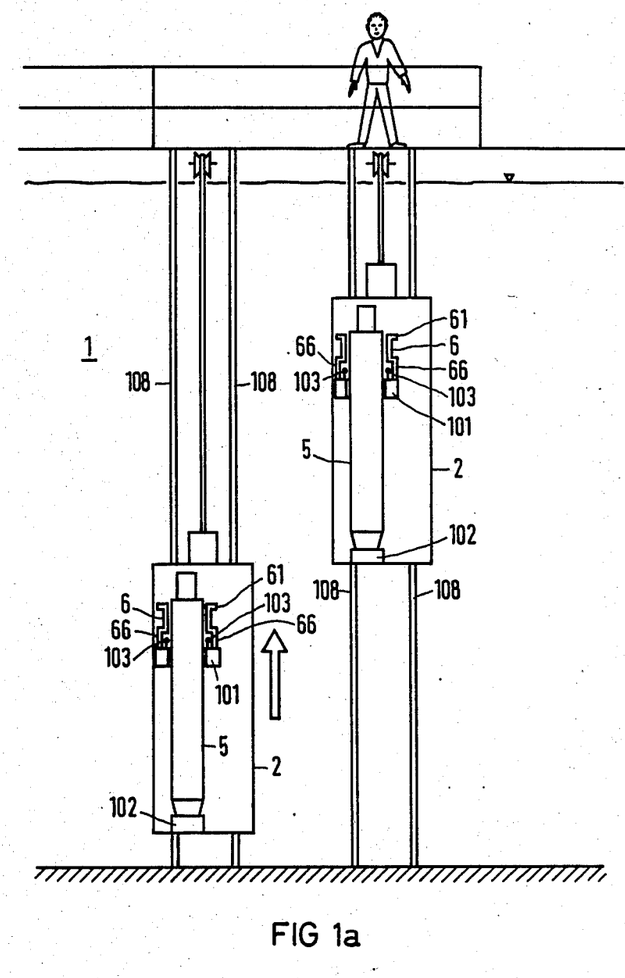
FIG. 1a is an elevational view of another embodiment of fuel-element channel stripping machines in a storage pool.
Figure 1B:
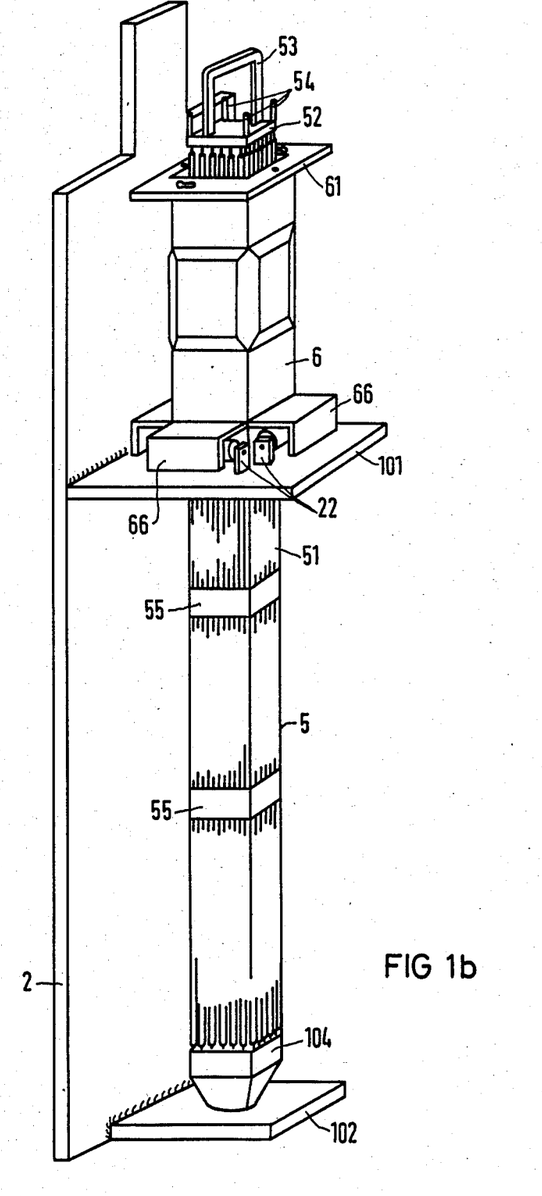
FIG. 1b is an enlarged perspective view of a channel stripping machine with a guide box placed thereon.
Figure 1C:
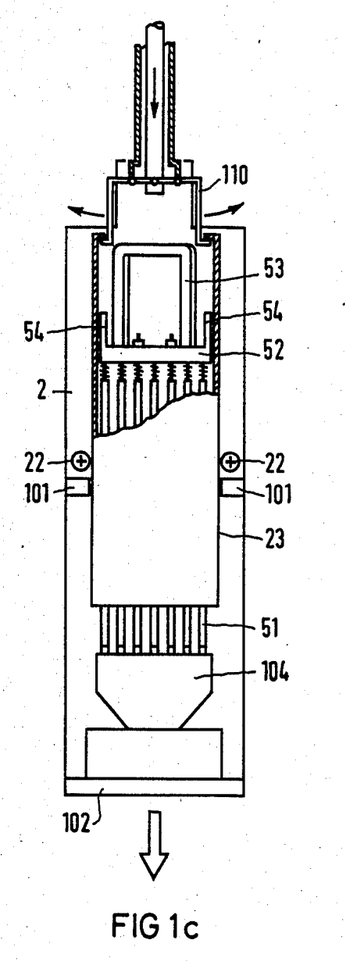
FIG. 1c is an elevational view, partly broken away and partly in section, of the channel stripping machine during stripping of a channel from a fuel assembly.

Referring now to the drawings and, first, particularly to FIGS. 1 and 1a thereof, there are seen fuel element channel stripping machines 2, according to the invention, arranged in a storage pool 1 of a nuclear reactor installation. A channel stripping machine 2 with a guide box 6 placed thereon is shown in perspective view in FIG. 1b, while FIG. 1c shows the channel stripping machine 2 during the stripping of the fuel assembly channel 23 from a fuel assembly. The channel stripping machine 2 shown at the left-hand side of FIGS. 1 and 1a is lowered on guide rails 108 at the pool wall to a greater depth in the storage pool 1. It is shown in FIG. 1 in relation to a fuel rod changing device 3. The channel stripping machine 2 to the right side of FIG. 1 has a higher position wherein, for example, the upper grid plate of the fuel assembly 5 is disassembled and the guide box 6 is set thereon, the length of the individual fuel rods 51 is measured and the fuel assembly structure is reassembled. To mount the fuel-element channel, the channel stripping machine 2 is again run into its lower position, as for an actual exchange of the fuel rods, because a water layer of at least 3 m must remain above the components that are to be handled, in order to assure radiation shielding. In FIG. 1, a so-called inspection position 21 is, moreover, indicated on the channel stripping machine 2, in which visual inspection of the removed fuel rods can be performed by means of a movable television camera. In FIG. 1a, the fuel assemblies 5 are held on this channel stripping machine 2 by form-fitting elements 101 and 102 which also prevent them from tipping-over or tilting. To reduce friction, the upper element 101 is further provided with guide rollers 22, which simultaneously prevent damage to the fuel element channels 23 which are to be drawn off.

As is shown in FIG. 1c, the fuel assembly channel 23 is stripped from a fuel assembly inserted into the channel stripping machine 2, the fuel element channel 23 at the upper end thereof being gripped from behind by a remotely controlled tool 110 and the channel stripping machine 2 being lowered, so that the fuel assembly channel 23 stripped from the fuel assembly is finally suspended from the tool 110.

Figures 2, 3:
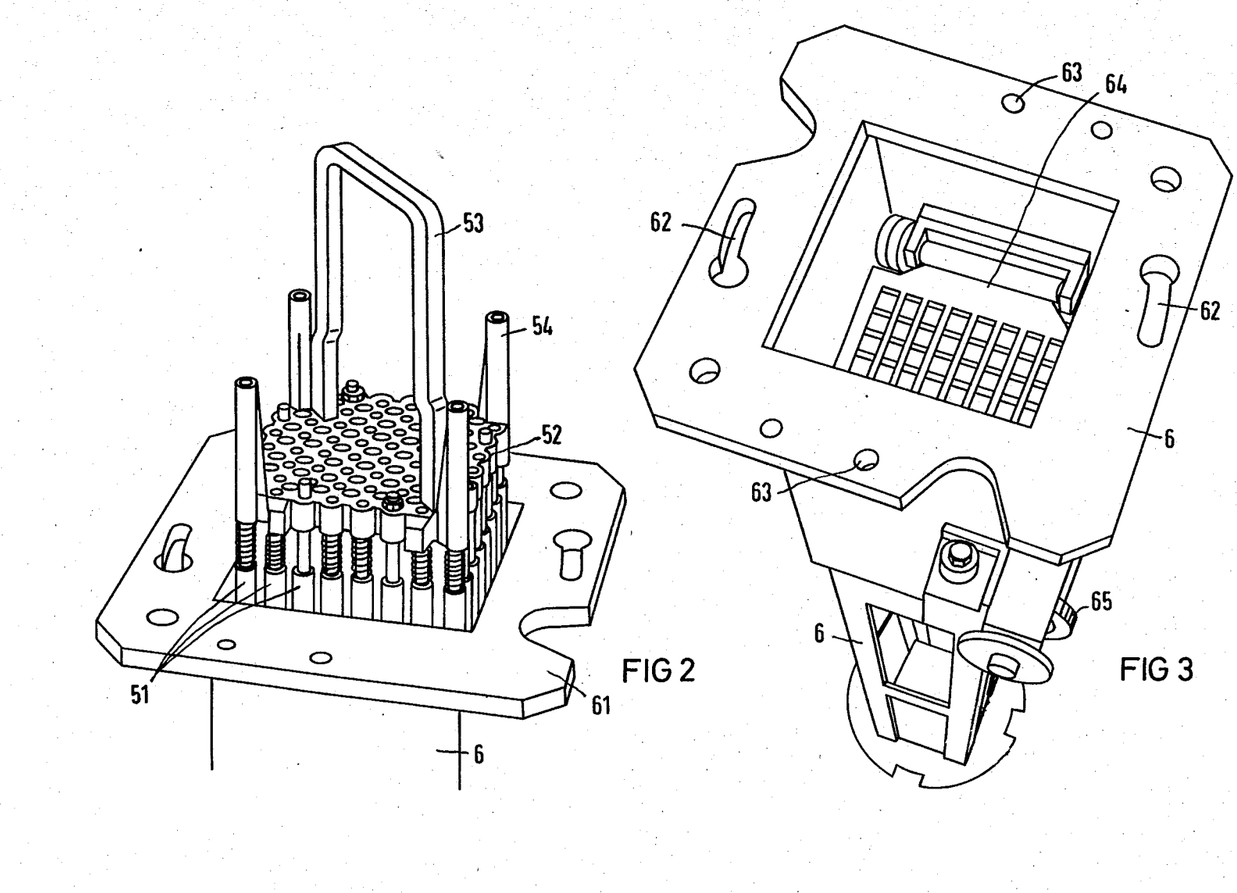
FIG. 2 is an enlarged perspective view of the upper part of a fuel assembly with the fuel-element channel removed and a guide box set on the fuel assembly.
FIG. 3 is another perspective view of the guide box of FIG. 2 before it has been set on a fuel assembly.

FIG. 2 shows the upper part of a fuel assembly 5, the fuel-element channel 23 of which has already been pulled off. The individual fuel rods 51 are supported slidingly in an upper grid plate 52; they are similarly supported in a lower grid plate 104. Eight fuel rods 51 are lengthened with a threaded bolt, respectively, and protrude through the upper grid plate 52 in the manner shown, and have respective nuts tightly screwed thereon. For manipulating the fuel assembly 5 as a whole, a handle 53 is provided which is integral with the upper grid plate 52. Similarly provided screw bolts 54 formed with a respective inner thread serve for fastening the fuel-element channel 23 not shown in FIG. 2. In this perspective view of FIG. 2, the guide box 6 with an upper face plate 61 is shown already set on the fuel assembly 5.

Figure 4:
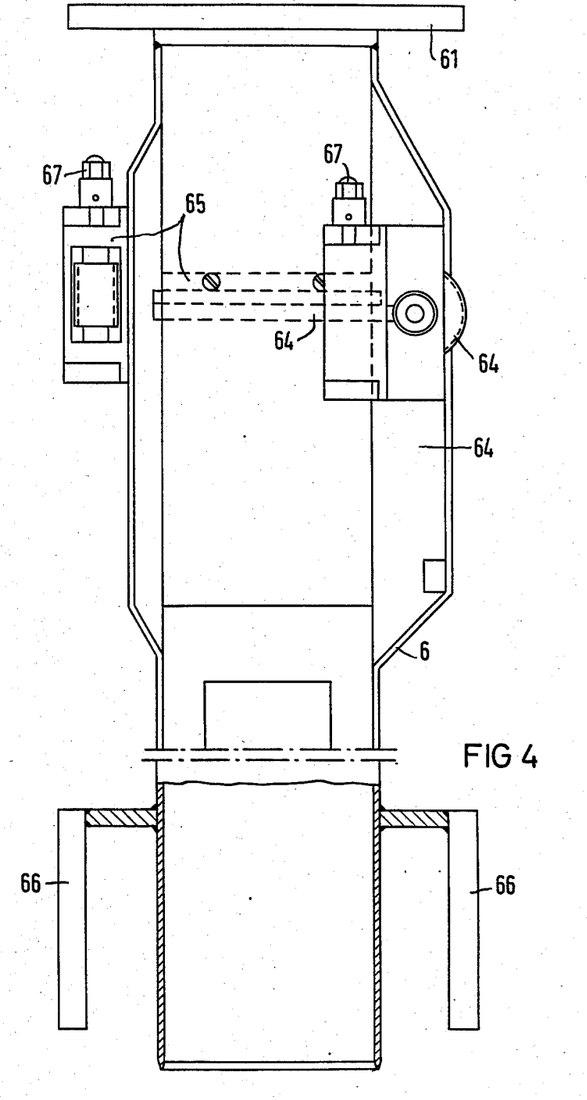
FIG. 4 is a side elevational view, partly broken away and partly in section, of the guide box of FIGS. 2 and 3.

This guide box 6 has the inner cross section as that of the removed fuel-element channel 23 and is centered by spacers 55, in the same manner as the removed fuel-element channel 23. At its lower end, the guide box 6 is provided with a fork 66 (FIG. 4) which rides on the upper element 101 with the guide rollers 22 of the channel stripping machine 2. In this manner, the exact level of this guide box 6 is always provided, and the upper part of the fuel assembly with the upper grid plate 52 projects out of the guide box 6.

Figures 5, 6:
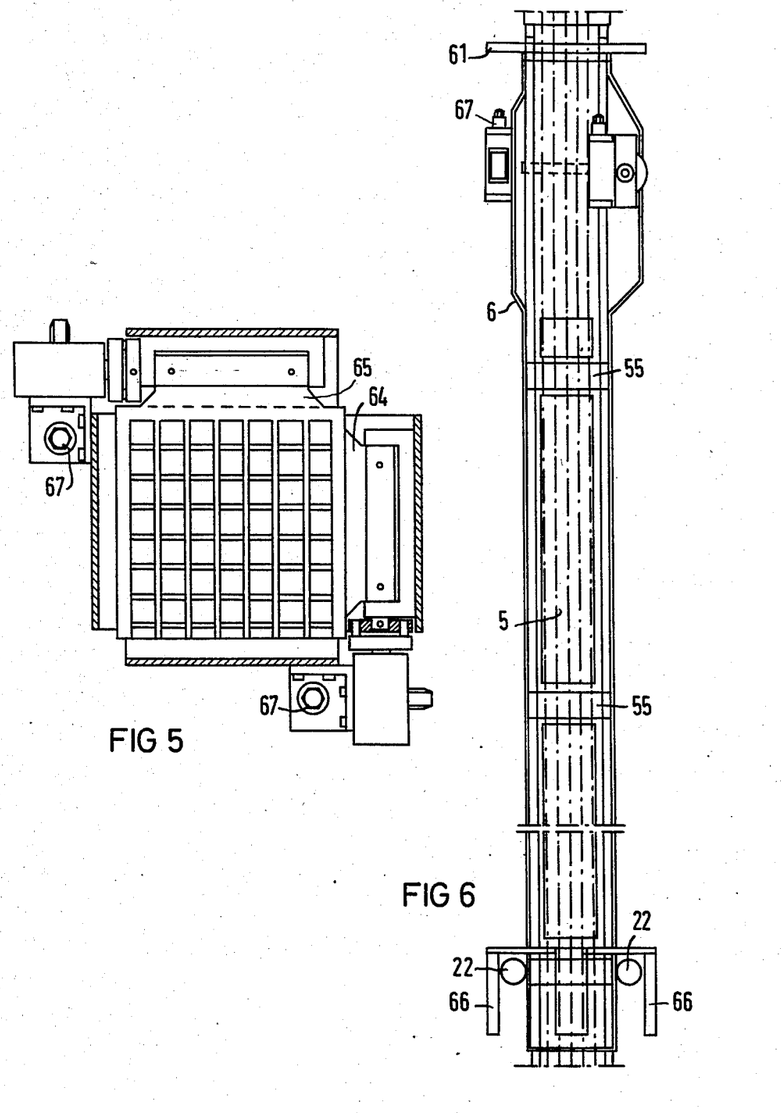
FIG. 5 is a cross sectional view of FIG. 4 taken along a nonillustrated horizontal line disposed at the level of the holding combs 64 and 65 for the fuel rods.
FIG. 6 is a fragmentary elevational view of a fuel assembly with the channel thereof removed and replaced by the guide box of FIGS. 2 to 5.

The guide box 6 is further provided with two hinged comb elements 64 and 65 which are offset 90° relative to one another and, in swung-in position, form a grid, as shown in FIGS. 3 and 5, through the meshes of which the fuel rods are guided, in a similar manner as with a spacer grid. This guide is then provided closely below the upper grid plate 52. These combs 64 and 65 are swingable via a worm drive by a turning tool engaging in the respective socket 67. After the combs 64 and 65 are run in, the upper grid plate 52 can be removed by loosening the fuel rod fastening nuts (note FIG. 2), so that the ends of the fuel rods 51 are thereby freely accessible.

Figure 7:
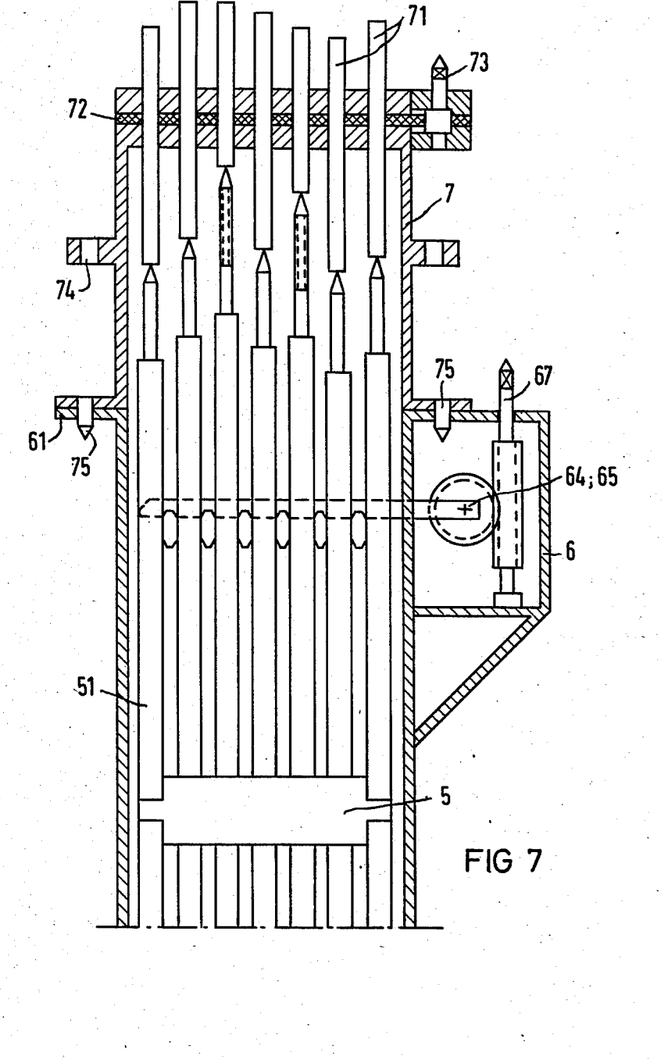
FIG. 7 is an enlarged, fragmentary sectional view of the upper end of a fuel assembly with a guide box replacing the channel thereof and with an indicator plate provided on the end plate of the guide box.
Figure 8:
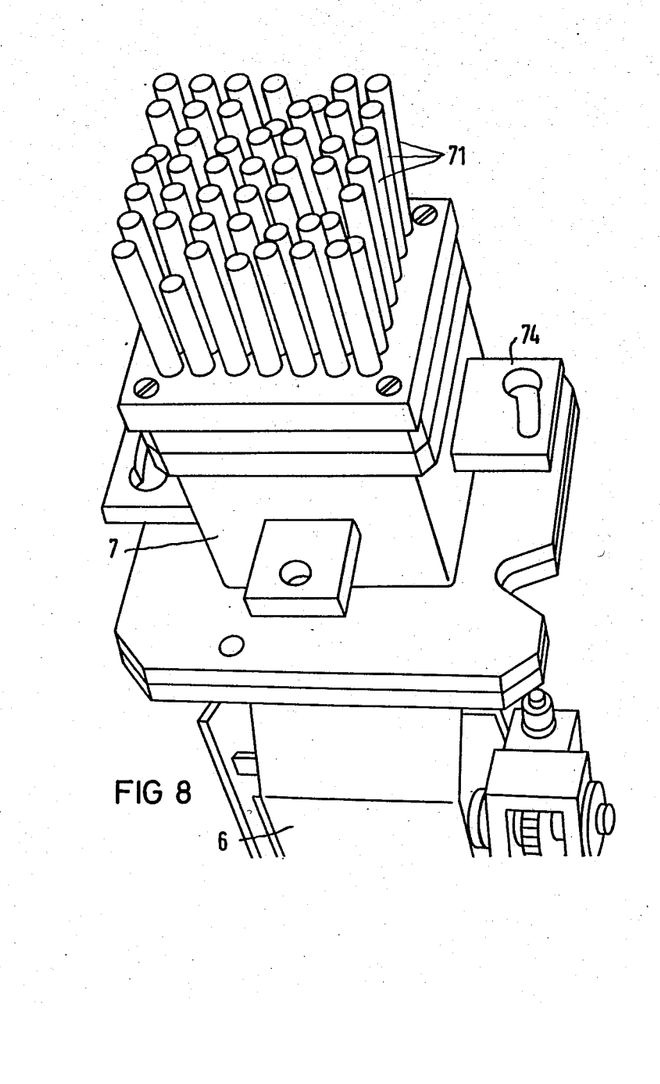
FIG. 8 is a perspective view of FIG. 7.
Figure 8A:
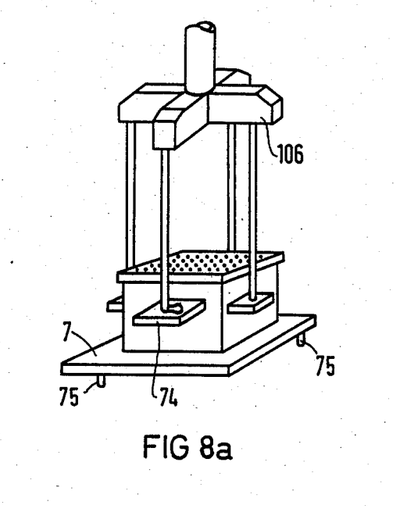
FIG. 8a is a perspective view of a manipulation tool for placing a centering plate on the guide box.

The fuel assembly is thereby made ready to an extent that repairs or a fuel rod exchange can be performed. The description of an indicator plate 7 on a guide box 6 is shown in a longitudinal cross sectional view on FIG. 7 and, similarly, in a perspective view in FIG. 8. By means of this indicator plate 7, which is mounted with the same manipulating tool 106 of FIG. 8a as is the guide box 6 on the face plate 61 of the guide box 6 by means of dowel pins 75, the growth of the individual fuel rods 51 can be investigated first. This purpose is served by indicator pins 72 which are guided over the individual fuel rod position, in a clamping plate with springs 72. In the manner shown in FIG. 7, the indicator pins 71 are shifted depending upon the length of the fuel rods 51, so that, after the indicator plate 7 is removed, the exact length or the elongation of these fuel rods can be read from the position of the indicator pins 71. So that these pins 71 cannot shift during the removal process and, thus, no falsification of the measurement results can occur, a so-called locking device 73 is provided, which can be operated conventionally via a remote-controlled tool. For manipulating this indicator plate 7, lateral clamping bars or straps 74 with engagement holes for a holding tool are arranged thereon.

From the changes in the length of the individual fuel rods which are determined with this fixture, one can calculate whether a fuel rod had slipped out of the upper grid plate due to varying growth of all the fuel rods, or whether a fuel rod had previously grown to the block. Furthermore, the new spacing to be adjusted between the fuel rod shoulders and the upper grid plate can be calculated from the measurement values obtained with the indicator plate 7. This spacing must be optimized so that no fuel rod slips out and as few fuel rods as possible sit on the block, the total force of all the springs being required to be large enough, additionally, so that a mounted fuel channel does not push, by its own weight, the upper grid plate onto the rod shoulders. The inspection by visual means previously mentioned in the introduction hereto, such as a movable or traveling television camera, for example, can furthermore reveal defective fuel rods.

Figure 9:
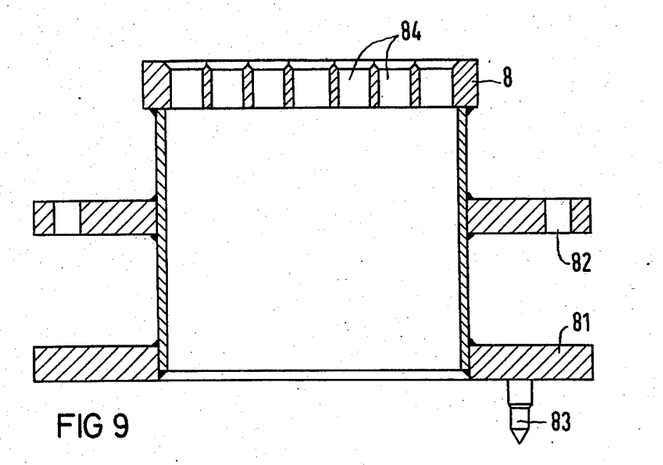
FIG. 9 is a sectional view of the centering plate according to the invention.
Figure 10:
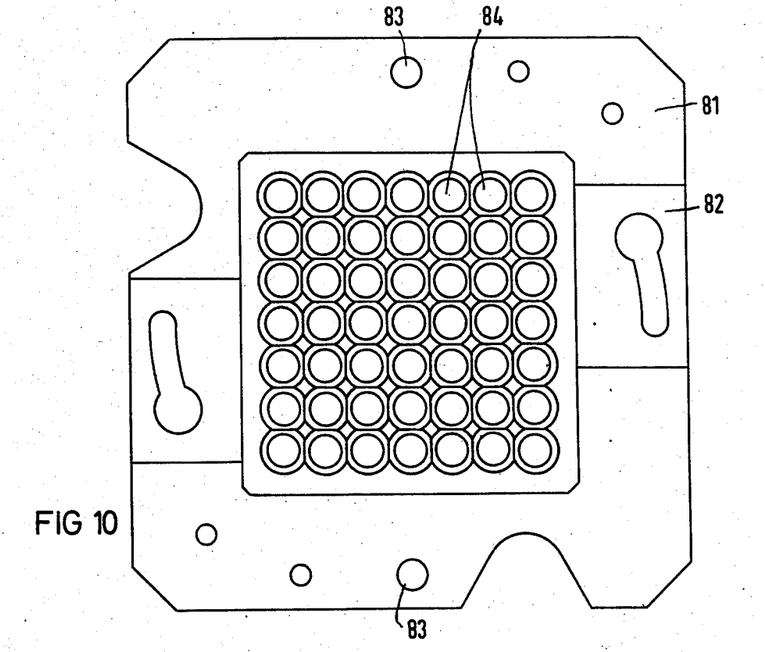
FIG. 10 is a top plan view of FIG. 9.
Figure 11:
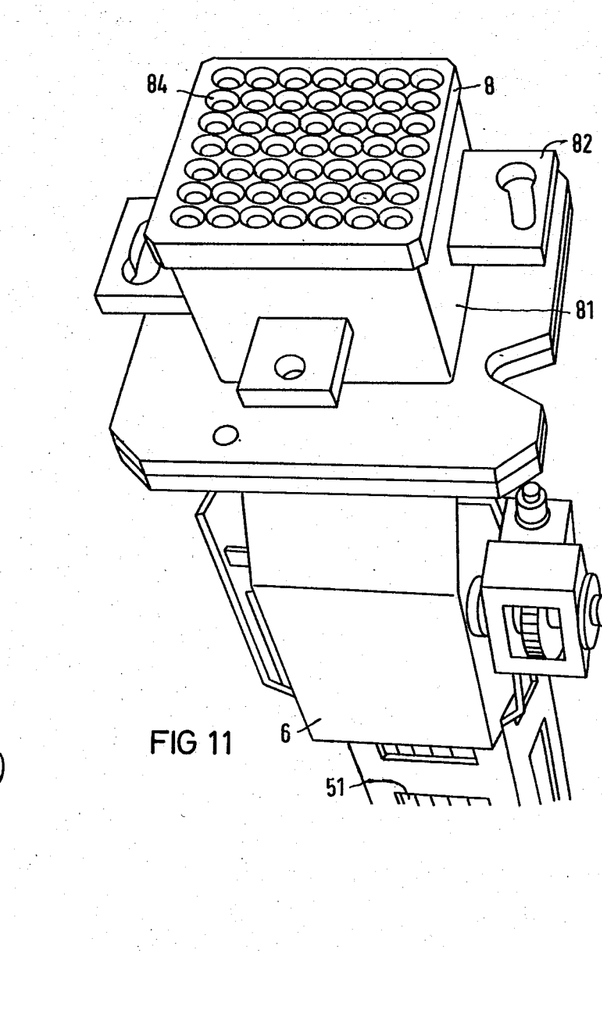
FIG. 11 is a view similar to that of FIG. 8 but having the centering plate of FIGS. 9 and 10 provided on the end plate of the guide box instead of the indicator plate.
Figure 12:
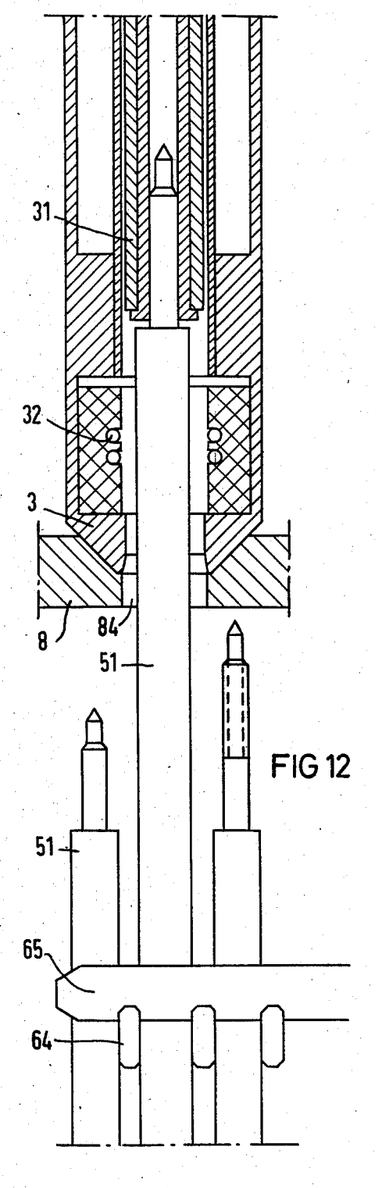
FIG. 12 is a fragmentary elevational view, partly in section, of the centering plate as used to center a fuel rod changing device over the respective fuel rods.

Since it would be difficult to grip the fuel rod, which are to be exchanged by means of the fuel rod changing device, through the great depth of water of the storage pool without damaging possibly adjacent fuel rods, a special aid or auxiliary device, namely, a centering plate 8, (note FIGS. 9 to 11) is likewise provided for this operation. This plate 8 is also mounted on the guide box 6 with the manipulating tool 106 according to FIG. 8a by means of dowel pins 83, and, similarly to the indicator plate 7, it is provided with lateral clamping bars or straps 82 formed with corresponding bores for engagement by a handling or manipulating tool. This centering plate 8 is further provided with a collar 81, to which ears or straps 82 are fastened, and which transmits the weight of the subsequently load-applying fuel rod changing device 3 to the guide box 6. For the intended use of this fuel rod changing device 3, this centering plate 8 is equipped with centering bores 84 above each of the fuel rod positions, the centering bores 84 being conically widened upwardly for more easily introducing the tool of the device 3; note in particular also FIG. 12. In the latter figure the fuel rod changing device 3 is shown in a condition wherein it is mounted on the centering plate 8, a fuel rod 51 being already gripped by the changing device 3 is shown in a condition wherein it is mounted on the centering plate 8, a fuel rod 51 being already gripped by the changing device 3 and being partly withdrawn from the fuel rod assembly. In this conventional fuel rod changing device 3, which is described, for example, in copending application Ser. No. 822,676 filed Aug. 8, 1977, an eddy current probe 32 is provided, by means of which the fuel rods or the cladding tube or casing thereof can be examined for damage during the withdrawal operation.

Figure 13:
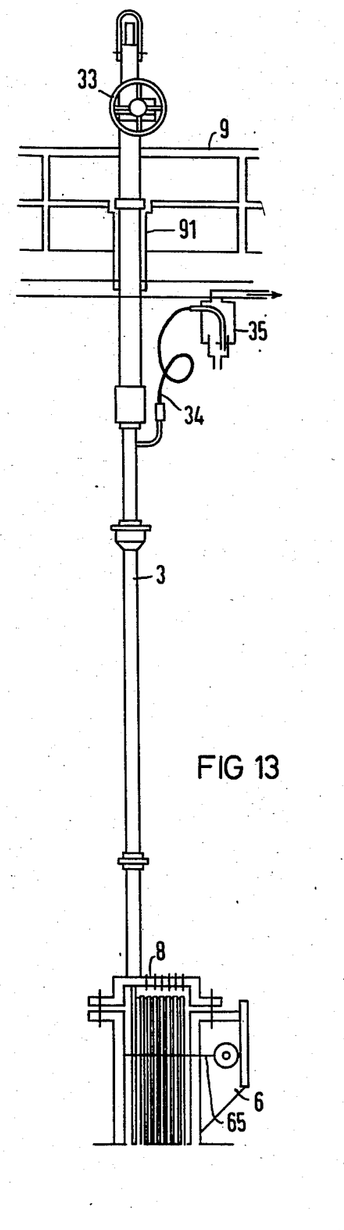
FIG. 13 is a fuel length elevational view of a fuel rod changing device disposed on the guide box of the invention.

FIG. 13 shows this fuel rod changing device 3 diagrammatically in full length in a condition wherein it is mounted on the guide box 6. At the upper end of this changing device 3, a device 33 for operating or actuating the grippers for seizing the end of the fuel rod as well as for raising the fuel rod is shown. The operation takes place from the operating platform 9, to which also the transporting device 91 for movement in two coordinates is fastened. During the fuel rod exchanging operation, the drawn fuel rod is rinsed or flushed continuously with pool water which exists at the upper end via a line 34 and is returned to the decay pool via a gas separator 35. Besides the eddy current probe, this gas separator 35 also provides the possibility of drawing conclusions from the exhaust air as to possible fuel rod defects.

Since a water layer of at least 3 m thickness must be provided above the fuel assembly and its parts, for reasons of shielding, the channel stripping machine 2 is lowered far enough prior to the fuel rod exchanging operation, so that this depth of water is ensured even when the fuel rod is drawn. This drawn fuel rod is subsequently deposited in a quiver on the channel stripping machine 2 and the replacement rod is taken from a quiver containing intact fuel rods, and is reinserted. At this point, it should also be noted that the construction of this fuel rod changing device 3 is such that buckling of the fuel rods, especially when being introduced into the fuel element assembly, is reliably prevented.

This embodiment described herein with the aid of the figures can, of course, also be modified in accordance with previously existing devices, and thus, especially with respect to matching the number of fuel rods in the fuel assembly as well as to the position of the spacer grids for centering the guide box 6 and the construction of the channel stripping machine 2 in view of the bracing conditions possible thereof. The basic element of the guide box 6 further offers the possibility of using additional auxiliary tools such as devices for detecting fuel rod defects, for example, which can be pushed over the fuel rod ends, in a conventional manner, and permit detection of the presence of water in the interior of the fuel rod by means of temperature and ultrasonic measuring techniques.

We claim:

1. Method of repairing under water by means of a channel stripping machine, a boiling water reactor-fuel assembly having a fuel assembly channel and an upper grid plate by disassembling the upper grid plate, determining a damaged fuel rod and exchanging the damaged fuel rod for another fuel rod by means of a fuel rod exchanging device, the method comprising first stripping off the fuel assembly channel, then disassembling the upper grid plate at the location thereof in the channel stripping machine, next placing on the fuel assembly a guide box with which the fuel rods of the fuel assembly are centered, then placing thereon an indicator plate and determining the varying growth of the fuel rods, and thereafter replacing the indicator plate by a centering plate to which the fuel rod-exchanging device is coupled.

2. Device for performing a method of repairing under water a boiling water reactor-fuel assembly having a fuel assembly channel and an upper grid plate by means of a channel stripping machine, said device comprising a guide box disposable on the fuel rods for centering the fuel rods, after the grid plate has been disassembled in order to determine and exchange a damaged fuel rod for another fuel rod, an indicator plate disposable on said guide box for determining varying growth of the fuel rods, and a centering plate having a fuel rod changing device coupled thereto, said indicator plate being replaceable by said centering plate.

3. Guide box according to claim 2, comprising means for supporting the guide box with respect to the channel stripping machine and with respect to spacers of the fuel assembly, and a plurality of combs swingable inwardly from two sides about a horizontal axis into spaces intermediate the fuel rods, said guide box being also formed with bores for receiving therein fitting pins of said indicator plate and of said centering plate, respectively, for mounting the respective plate on the guide box.

4. Indicator plate according to claim 2 including a plurality of pins adjustable above respective fuel-rod positions by contact with the fuel rods, and lockable in the respective adjusted position thereof for determining varying fuel-rod lengths.

5. Centering plate according to claim 2 having means defining conical bores located above respective fuel-rod positions, and a collar with a cross-sectional shape corresponding to that of a fuel-assembly channel removed by the channel stripping machine, said collar being of a construction for transmitting to said guide box a load applied by the fuel-rod changing device, said centering plate having fitting pins for ensuring in-register positioning of said conical bores above the respective fuel-rod positions.

* * * * *